Figure 1:
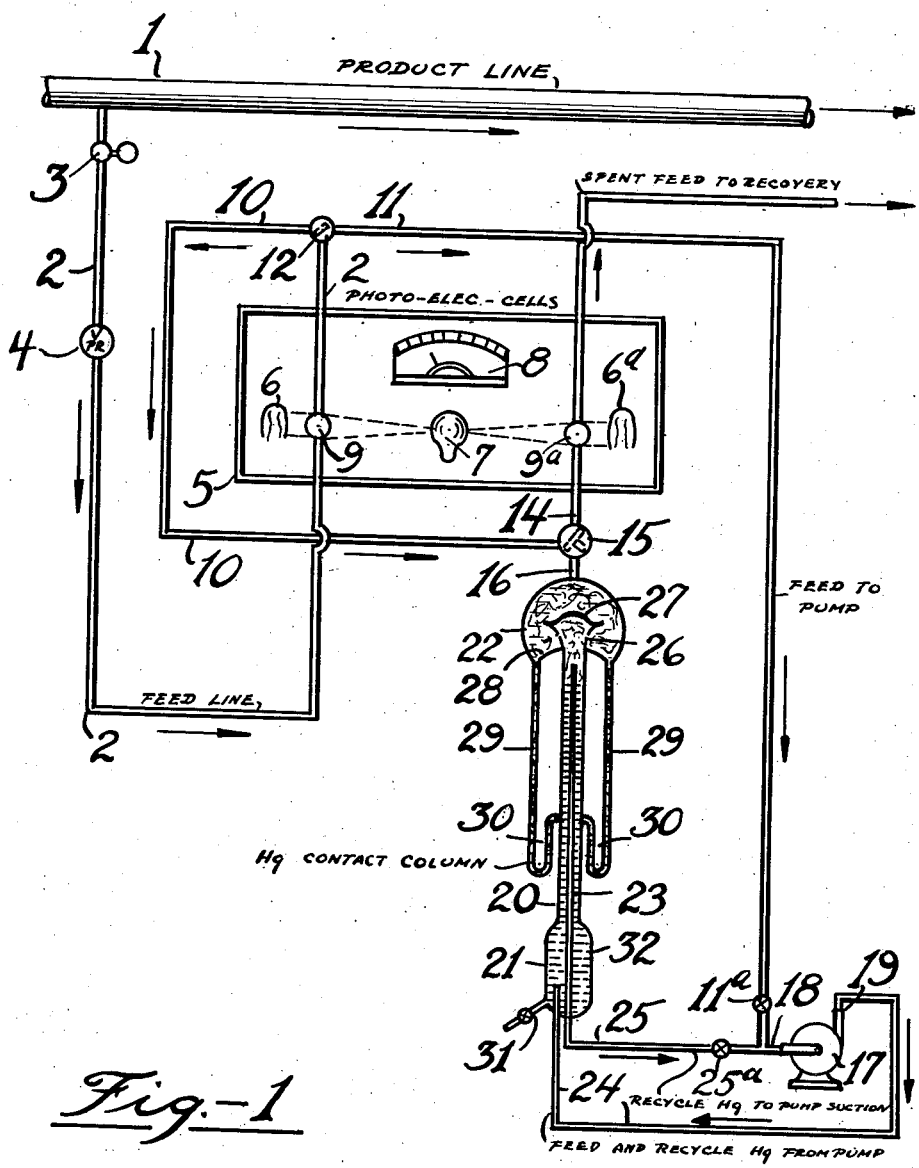

Patented Nov. 7, 1944

2,362,278

UNITED STATES PATENT OFFICE 2,362,278

METHOD AND APPARATUS FOR DETERMINING SULPHUR CONTENT OF A FLUID STREAM

Minor C. K. Jones, Elizabeth, N. J., assignor to Standard Oil Development Company, a corporation of Delaware Application August 2, 1940, Serial No. 349,392

5 Claims. (Cl. 23—230)

The present invention relates to a method and means for determining the presence of chemically reactive materials present in a fluid material as a suspension or in chemical combination therewith. More particularly, it relates to a method and means for determining the presence of small amounts of a chemically reactive material in a light hydrocarbon distillate. Specifically, the invention relates to such a method and means for determining the presence of small amounts of free or reactive sulphur in a light hydrocarbon distillate which has been subjected to a sweetening treatment with sodium plumbite, and subsequently with free sulphur.

As is well known in the art, the sweetening of hydrocarbon distillates to obtain improvement in odor and the like, may be effected by the oxidation of mercaptans present in the product. This may be accomplished, for example, by agitating the oil with a solution of sodium plumbite which reacts with the mercaptans present to form corresponding lead mercaptides. Sulphur is then added to react with the mercaptides to form lead sulphide and organic disulphides, of which the former are removed by settling.

In continuous systems, a solution of sulphur in oil and the sodium plumbite solution are introduced into a stream of oil simultaneously, the oil stream flowing through mixing columns to settling tanks for separation of the precipitant lead sulphide. In such a procedure, a slight excess of sulphur must be used to accomplish complete extraction of the lead mercaptide, but if color stability and non-corrosive characteristics, and maximum octane value are desired in the finished product, it is important that the excess sulphur used be controlled within fairly close limits. For this purpose, it is customary at frequent intervals, to determine the amount of reactive sulphur present, using what is known as the "mercury number" test.

Following the conventional procedure, the determination is made by shaking not more than 60 ml. of sulphur-treated distillate with 20 ml. of metallic mercury in a four ounce clear glass bottle, for exactly two minutes. Immediately thereafter, the bottle is held within ½ inch of a 60 watt, inside frosted, electric bulb on which has been painted a black horizontal line ⅛ to ¼ inch wide. If the black line is clearly visible, the sample is reported as having a mercury number of less than 2, that is, it contains less than 2 mgs. of reactive sulphur per 100 ml. of distillate. If the line is barely visible, the product is reported as having a mercury number of 2.

If in the first test, the black line is not visible through the distillate, another 60 ml. sample is prepared by mixing various proportions of distillate with a sulphur-free diluent, and testing in the same manner. The mercury number is roughly obtained by dividing the number of milliliters of distillate in the sample tested into 120. Thus using 60, 50, 40, 30, and 20 milliliters of distillate to 0, 10, 20, 30, and 40 milliliters of sulphur-free solvent will indicate mercury numbers of from less than 2 to above 6. This testing procedure, however, is not too reliable. Fractional numbers are not determinable with sufficient accuracy, and values below 2 are not readily distinguishable.

In current operations, it has become desirable to control the mercury number of sulphur-treated distillates more closely than in the past and to obtain products containing less than 2 mgs. of reactive sulphur per 100 ml. of product. Therefore, it is an object of this invention to provide a method and means for determining the mercury number of a distillate material in which all values from 0 to above 6 may be accurately obtained. Moreover, it is an object of the invention to provide a system which may be utilized to continuously indicate, record and control the mercury number of a product obtained in a continuous treating process.

Figure 2:
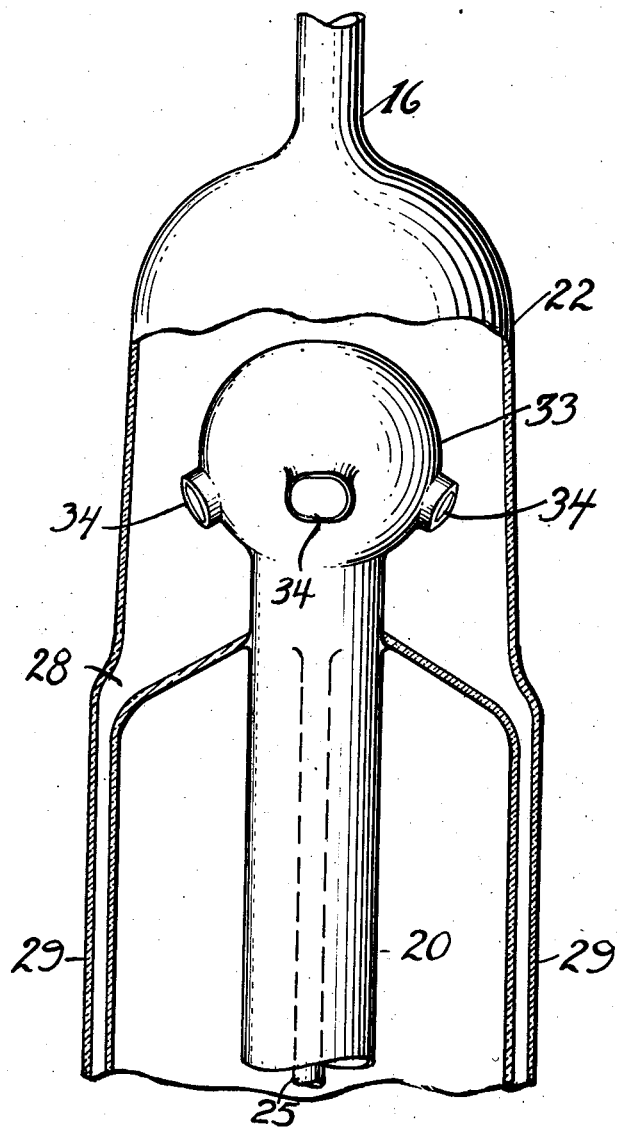

The invention, these, and other objects may be fully understood from the following specification when read in conjunction with the accompanying drawings in which:

Fig. 1 is a generally diagrammatic view of the apparatus with a portion shown schematically in cross section; and Fig. 2 is a vertical section through another form of contactor column.

Referring now to Fig. 1, the numeral 1 designates a product line through which flows a stream of product to be tested, for example, a stream of gasoline from the final step of a continuous process in which the gasoline has been subjected to sweetening and sulphur treatment in the manner set forth above. The product in line 1 preferably has been tested for color quality and means may be provided in the system ahead of the present apparatus to maintain any desired value therefor. A sampling line 2 draws a small quantity of product from the line 1 by means of the pump 3. Preferably the pump 3 should be of such type as to provide for continuous withdrawal of product from the line 1 at a rate which is proportional to the flow therethrough, and should be capable of discharging the product so withdrawn, at a pressure up to 25 pounds per square inch. However, if the product in the line 1 is under sufficient pressure, the pump 3 may be dispensed with in favor of another device. In any event, it is desirable to provide a regulatable pressure reducing valve 4 in the line 2 as shown. The product withdrawn from line 1 may be termed the feed material for the system illustrated.

The feed, passing through the valve 4 is carried by the line 2 to a photo-electric instrument 5 in which are included light sensitive elements 6 and 6a, a light source such as lamp 7, and a meter 8 suitably connected to provide a comparative reading of any variation in the currents generated in the respective light sensitive elements 6 and 6a. Also included in the structure of the instrument 5, are transparent conduit elements 9 and 9a disposed in the path of light directed against the elements 6 and 6a from the lamp 7.

The conduit element 9 is interposed in the line 2 which extends through the instrument into communication with lines 10 and 11 by way of the two-way valve 12. Line 10 in turn extends into communication with line 14 by way of the three-way valve 15. This valve provides for mutually exclusive communication of lines 10 and 16 with line 14, as shown. The line 14 also extends through the instrument 5, having a transparent conduit element 9a disposed in the path of light from the lamp 7 to the light-sensitive element 6a. Leaving the instrument 5, the line 14 discharges into a spent-feed recovery system, not shown.

The instrument 5 may be balanced and calibrated by sending a stream of treated distillate through the line 2 into line 10 through valve 12, and thence through valve 15 into the line 14, while passing a shaft of light through the transparent conduit elements 9 and 9a into contact with the light-sensitive elements 6 and 6a. When the elements 6 and 6a have been placed in balance by such conventional adjustments of the instrument 5 as may be necessary, the meter 8 is set for a zero reading, and the valve 12 reset to divert the flow of feed from line 2 into line 11, and the valve 15 is reset to place lines 16 and 14 in communication, to the exclusion of line 10.

The remainder of the apparatus is composed of a pump 17 having an inlet connection 18 and an outlet connection 19, forming a primary contact zone, and column 20 having a well 21 and a separator dome 22, forming a secondary contact zone and a separation zone. Baffle members 23 form a tortuous path through the column. The pump 17 from outlet connection 19 discharges into the well 21 by means of line 24. A draw-off line 25 is provided in the column 20 which connects with the pump 17 by way of the inlet connection 18. Line 11 is also connected into the pump by connection 18, and valves 11a and 25a are provided for proportioning flow from lines 11 and 25 respectively. The column 20 extends into the separator dome 22, opening thereinto by way of ports 26, the upper end of the column being closed by a distributor or baffle cap member 27. The dome 22 is formed with a trough portion 28 which is suitably sloped to provide drainage into the drain-back lines 29, trapped at 30, and at the lower ends opening into the column at an intermediate point. One or more such lines may be provided, but it is preferred that at least four be contemplated. A valved line 31 opens into the well 21 at a low point for introduction or drainage of a body of metallic mercury 32 maintained in the well and column.

With the instrument 5 balanced in the manner set forth above, and pump 17 operating to circulate metallic mercury through the column by way of lines 25 and 24, the valves 12 and 15 in the distillate conduit system are reset so as to place line 2 in communication with line 11, to the exclusion of line 10, and line 16 in communication with line 14, to the exclusion of line 10. In balancing the instrument, correction is made for variations in line voltages and for variations in the base color of the fluid feed before contact in the system. The distillate feed material may now flow through the mercury contact system including the pump 17 and column 20.

The valves 11a and 25a being adjusted to obtain the desired flow ratio between the feed and the mercury, both enter the primary contact zone provided by the pump 17, where vigorous agitation takes place, forming a partially emulsified mixture of distillate, mercury and such black mercuric sulphide as may have been formed. From the pump, the mixture is discharged into well 21, passing into the secondary contact zone formed by the body of mercury 32 maintained in the well and column 20. Passing upwardly through the body of mercury, the distillate material follows a tortuous path provided by the baffles 23, thus completing the contact required for complete conversion to mercuric sulphide, of any reactant sulphur present in the original feed drawn from the line 1 through lines 2 and 11.

Having completed its passage through the mercury in column 20, the distillate with such mercuric sulphide as may have been formed in the contact zones, discharges into the separator dome 22, through the ports 26. In the dome, a certain degree of settling action is obtained due to the enlargement of the liquid space, and straight-through flow of any portion of the distillate emerging from the ports is prevented by the baffling action of the cap member 27. During its passage through the dome, any portions of metallic mercury which may have been carried over with the distillate, will settle out and falling into the trough 28 will be returned by gravity to the main body in column 20.

The contacted distillate, with the finely divided black mercuric sulphide suspended therein, discharges from the dome 22 through the line 16 and valve 15 into the line 14, passing through the transparent element 9a. The presence of mercuric sulphide in the liquid flowing through the element 9a will modify the intensity of the light beam which strikes the element 6a and thus unbalance the original relationship between the two elements 6 and 6a. Such an unbalanced condition is indicated by movement of the indicator needle of meter 8. In operating according to the procedure given above, it has been found possible to obtain accurately reproducible results when using feed materials for which the reactive sulphur content has been quantitatively predetermined. In addition, the apparatus has been found to be highly sensitive, indicating even fractional changes in reactive sulphur content from zero upward.

In Fig. 2, another type of contact column is illustrated. In the arrangement shown, the column 20 terminates at its upper end in a distributor cap 33, which, as the cap 27 in Fig. 1, may be formed integrally with the column end or applied thereto in any desired manner. The cap member 33 differs from member 27 of Fig. 1, in that it has a cup or bell-shaped form, and provides for an air cushion above the liquid discharging from the column through the cap ports 34. The purpose of the cushion is to aid in maintaining a substantially constant flow through the dome 22, preventing such excessive agitation of the material in the dome as to result in incomplete settling out of the metallic mercury which may carry over from the column 20. The type of column illustrated in this figure has been found to be most efficient and is preferred.

The system as described, may be so arranged as to provide a continuous indication and record of the condition of the feed material by suitable connection of the meter 8 in a clock controlled recording mechanism. Likewise, by suitable connection into an electric relay system, movement of the meter dial arm may be used to automatically control the operation of the sulphur-treating step in order to maintain a proper balance therein which will produce a treated material having a mercury number of any desired value.

Although the invention has been set forth with respect to specific embodiments as illustrated in the drawings, it is not to be considered as limited thereby. Considerable changes in the apparatus and method of operation may be made without departing from the basic concept as set forth by the appended claims.

I claim:

1. A method of continuously determining the reactive sulphur content of a stream of sulphur-treated fluid, comprising continuously passing a portion of said stream into intimate contact with a stream of metallic mercury drawn from a confined body thereof whereby a reaction product of black mercury sulphide is formed, discharging the mixture of fluid and mercury into said confined body of mercury, separating the mercury from the contacted fluid and the mercury sulphide contained therein, removing the contacted fluid and mercury sulphide from the confined body of mercury, and photo-electrically comparing its light transmission with that of the unreacted fluid.

2. Apparatus of the character described, comprising a main conduit for a stream of a sulphur-treated fluid, a reservoir for a body of metallic mercury, including a separator column, means including a conduit connected to the reservoir and having a pump for circulating the metallic mercury through said reservoir and column, means including a transparent portion connecting said main conduit and the suction side of said circulating means for feeding fluid from the conduit stream to the suction side of said circulation means into intimate contact with said mercury, conduit means connected to said separator column and including a transparent portion for withdrawing the contacted fluid from the separator column, and photo-electric means positioned adjacent said transparent portions and adapted to scan the feed and contacted fluid streams comparing the light transmitting capacity of the latter with that of the former.

3. Apparatus according to claim 2 in which the separator column comprises an elongated body portion intermediate the ends, and the reservoir portion is at the lower end of said body in open communication therewith, a bulbous closure member for the upper end of said body, having a plurality of ports peripherally disposed in the lower portion thereof, a separator dome enclosing said member, integrally joined to the body, having a draining trough portion adjacent the joint, and a plurality of trapped conduits communicating between said trough portion and the body adjacent its lower end.

4. The method of continuously determining the reactive sulfur content of a stream of sulphur-treated fluid, which comprises circulating mercury in a confined flow to and from a reservoir of mercury, passing the stream into the flow of mercury to the reservoir whereby intimate contact of the mercury and fluid is obtained to completely convert the sulphur into black mercury sulphide, withdrawing the reacted fluid from the mercury, and photoelectrically comparing its light transmission with that of the unreacted fluid.

5. The method of continuously determining the reactive sulphur content of a stream of sulphur-treated fluid, which comprises circulating mercury in a confined flow to and from a reservoir of mercury, passing the stream into the flow of mercury to the reservoir whereby intimate contact of the mercury and fluid is obtained to completely convert the sulphur into black mercury sulphide, separating the reacted fluid containing entrained mercury from the main body of mercury, returning the entrained mercury to the mercury reservoir, and photo-electrically comparing the light transmission of the reacted fluid with that of the unreacted fluid.

MINOR C. K. JONES.